May 12, 1936.  H. A. CUTTING  2,040,125

WINDSHIELD DEFROSTING DEVICE

Filed Jan. 16, 1935

INVENTOR.
Herbert A. Cutting,
BY
ATTORNEYS

UNITED STATES PATENT OFFICE 2,040,125

WINDSHIELD DEFROSTING DEVICE

Herbert A. Cutting, Detroit, Mich., assignor to Cutting Sales Engineering Co., Detroit, Mich., a corporation of Michigan Application January 16, 1935, Serial No. 1,998

15 Claims. (Cl. 20—40.5)

This invention relates to windshield defrosting devices wherein ice lodging or forming on the exterior of the windshield is prevented and wherein the deposition of moisture interiorly of the windshield is likewise prevented, over areas sufficiently large to provide adequate vision for a driver.

A principal object is to utilize heat from the engine cooling system by means of a device making use of the principle of conduction and also of convection.

Another object is to provide a device of this kind which may be readily applied and removed as an accessory, which may be easily and economically constructed, which lends itself to mass production and which is decorative in appearance.

Other objects and advantages will become hereinafter more fully apparent as reference is had to the accompanying drawing wherein my invention is illustrated by way of example and in which—

More particularly, 1 indicates the windshield of a vehicle 2 equipped with a special or conventional power plant, not shown but which has a fluid cooling system into which are connected fluid feed and return lines 3, in any suitable manner. These lines 3 are connected to a metallic conduit preferably in the form of a tube 4 bent into a U coil. Additional turns may be added if desired but I have found the U coil to be sufficient for all ordinary winter driving.

Figure 1:
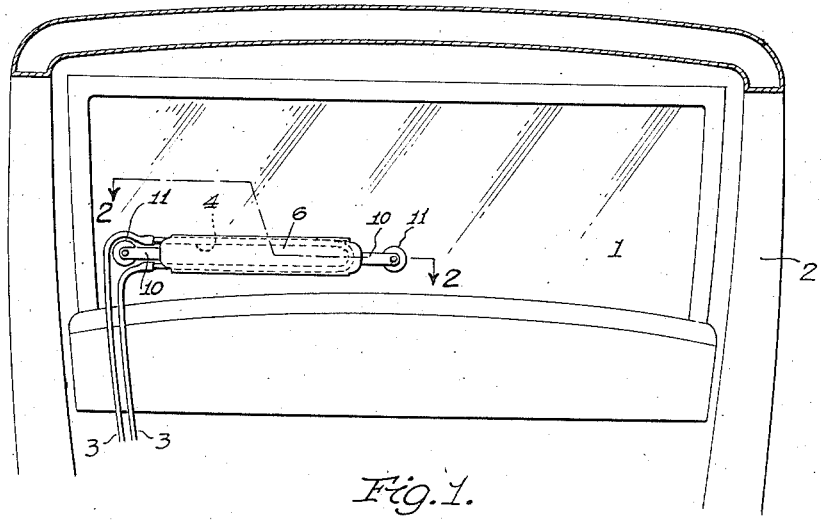
Figure 1 is a transverse vertical section through an automobile showing my invention applied to the windshield.
Figure 2:
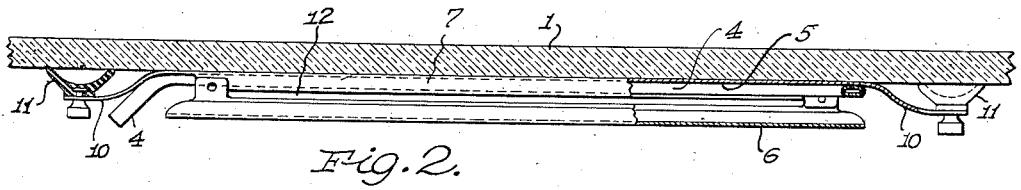
Fig. 2 is an enlarged horizontal section taken along the line 2—2 of Fig. 1.
Figure 3:
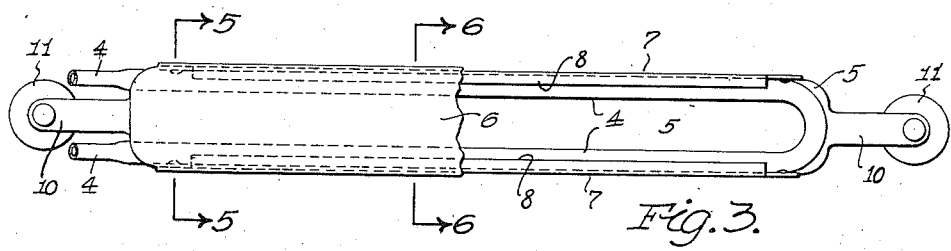
Fig. 3 is an enlarged plan elevation of the device, partially broken away.
Figure 4:
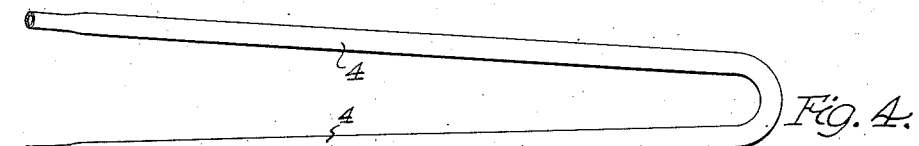
Fig. 4 is an elevation of the coil ready for assembly.
Figures 5, 6, 7:
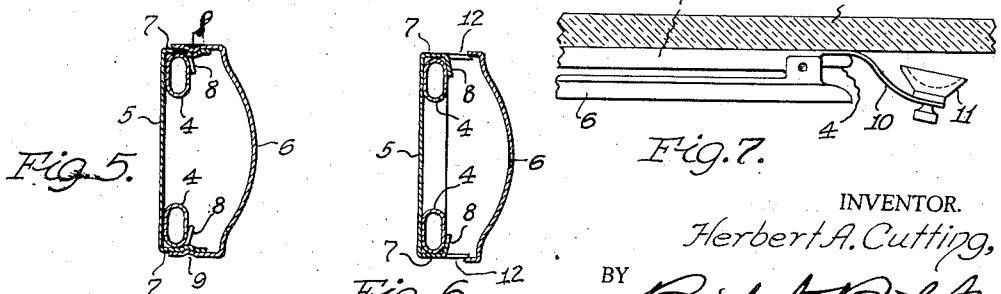
Fig. 5 is a transverse section taken along the line 5—5 of Fig. 3.
Fig. 6 is a transverse section taken along the line 6—6 of Fig. 3.
Fig. 7 is a detail view illustrating the application of the device to a windshield prior to attachment thereto.

In order to receive the tube 4 I provide a housing 5, 6 flattened on the side thereof which is to confront the windshield 1. The flat side of the metallic part 5 has side walls 7 bent inwardly at 8 to form a channel having a resilient side wall. Before installation the U of the tube 4 is expanded as indicated in Fig. 3 so that upon placement of the tube into the channel of the placement of the tube 4 is retained in position by its part 5 the tube 4 is retained in position by its inherent springiness and by the resilience of the wall 8 so that soldering, welding and other means of attachment are unnecessary.

The cover 6 of the housing is then assembled on the member 5, the side walls of this member 6 enveloping the side walls 7, 8. The members 5 and 6 may be held together by snap dents 9 or in any other suitable manner.

Integral with the member 5 are resilient arms 10 having suction cups 11 at their outer ends. Upon the placement of the flat side of member 5 against the windshield 1 the cups 11 do not tend to engage the windshield but it is necessary to press the cups against the resiliency of the arms 10 to obtain gripping with the windshield. These arms therefore retain the housing 5, 6 in pressure imposing contact with the glass so that the coil 4 is in conductive contact with the windshield through the member 5.

The arms 10 are so connected to the cups 11 that a continuous pull is exerted thereagainst in a direction normal to the windshield. I have found that this continuous pull is effective in giving an apparently better union with the glass and consider this discovery of considerable importance.

Through the housing 5, 6 I provide vertical openings or slots 12 through which a convective flow of air may be induced to flow to the windshield above the device. Since there is no condensation of motion on the interior of the windshield above my device it is believed that this convective flow is effective in preventing it. I thus provide a conductive heating of the windshield whereby heat is transmitted to the outer surface of the glass with a comparatively low temperature source of heat supply and I also provide an additional convective heating for the interior of the windshield.

What I claim is:—

1. A defrosting device comprising a fluid conduit, manually attachable and removable means for retaining said conduit in conductive contact with a window pane whereby heat is transferred to said pane by conduction, and means for conducting a flow of heated fluid through said conduit.

2. A defrosting device comprising a metallic conduit, manually attachable and removable means for maintaining said conduit in pressure imposing, conductive contact with a windshield, and means for conducting a flow of heated fluid through said conduit.

3. A defrosting device comprising a flattened metallic conduit, resilient means for maintaining said coil in pressure imposing, conductive contact with a windshield, and conduit means for conducting a flow of heated fluid through said conduit.

4. A defrosting device comprising a metallic conduit, resilient arms operatively connected to said conduit, and suction cups connected to the outer ends of each of said arms, said arms upon pressure of said cups into glass gripping position maintaining said coil in pressure imposing conductive contact with said glass.

5. A defrosting device comprising a metallic conduit, resilient arms operatively connected to said conduit, and suction cups connected to the outer ends of each of said arms, said arms upon pressure of said cups into glass gripping position maintaining said coil in pressure imposing conductive contact with said glass, said arms applying pressure to said cups normal to the plane of contact of said cups with said glass.

6. In a vehicle having a fluid cooled power plant and a windshield, in combination, a metallic conduit in pressure imposing conductive contact with the windshield, and conduit means connected into the fluid cooling system of the power plant for conducting heated fluid to said conduit.

7. In a vehicle having a windshield and a power plant with a fluid cooling system, in combination, a flattened metallic conduit, means for maintaining said flattened conduit in pressure imposing conductive contact with the windshield, and means for conducting heated fluid from the cooling system of the power plant through said conduit.

8. In a defrosting device for a vehicle windshield, a metallic conduit, a metallic plate member, means for retaining said conduit in conductive contact with said plate member, means for securing said plate member with said conduit in contact with the windshield, and means for conducting a flow of heated fluid through said conduit.

9. In a defrosting device for a vehicle windshield, a metallic conduit, a metallic housing for said conduit having one flat side, means for retaining said conduit in said housing in conductive contact with said flat side, means for securing said housing to the windshield with the flat side thereof in pressure imposing relation with said windshield, and means for conducting a flow of heated fluid through said conduit.

10. In a defrosting device for a vehicle windshield, a flattened metallic tube, a metallic housing for said tube having one side flat, means for retaining said conduit in said housing in conductive contact therewith, spring arms extending outwardly from said housing and having suction cups on the ends thereof, said arms upon pressure of said cups into windshield gripping position imposing pressure contact of said flat side with said windshield, and means for conducting a heated fluid through said conduit.

11. In a windshield defrosting device, a two part housing, one of said parts being flat and having side walls bent inwardly at their outer edges, a second part adapted for envelopment of and connection to said side walls, a U-shaped metallic conduit of springy material for residence in said housing and adapted to be urged in pressure contact with said flat side by its shape and by the shape of said inturned side walls, spring means for securing the flat side of said housing against the windshield, and means for conducting a heated fluid through said conduit.

12. In a windshield defrosting device, a two part housing, one of said parts being flat and having side walls with their outer edges inturned to form a channel with a resilient side wall, a U-shaped flattened metallic coil of inherent springiness for placement in said channel, said flat side and said coil being retained in pressure contact by the inherent springiness of the coil and by the resilience of said channel side wall, resilient arms integral with said flat side having suction cups at the outer ends thereof for attachment to the windshield, a second part of said housing adapted to envelop the side walls of the first named part and to cover said coil, and means for conducting a heated fluid through said coil.

13. The combination as set forth in claim 11 wherein said housing has openings through the side walls thereof for the flow of air thereover whereby a flow of air is induced through said housing and to that part of the windshield thereabove.

14. In a windshield defrosting device for a vehicle, a heated conduit in conductive contact with the windshield, and flue means for directing a convective flow of air from said conduit to that portion of the windshield above said device.

15. In a windshield defrosting device, a heated, flattened metallic conduit, a housing for said conduit in conductive contact therewith, one side of said housing being flat, spring arms having suction cups at the outer ends thereof, said spring arms imposing pressure contact of said flat side with the windshield upon pressure of said cups in windshield gripping position, said housing having vertical openings therethrough for the inducement of a convective flow of air to said windshield above said device.

HERBERT A. CUTTING.